United States Patent
Hirao

(10) Patent No.: US 11,901,124 B2
(45) Date of Patent: Feb. 13, 2024

(54) MULTILAYER CERAMIC CAPACITOR

(71) Applicant: Murata Manufacturing Co., Ltd., Nagaokakyo (JP)

(72) Inventor: Takahiro Hirao, Nagaokakyo (JP)

(73) Assignee: MURATA MANUFACTURING CO., LTD., Kyoto (JP)

(*) Notice: Subject to any disclaimer, the term of this patent is extended or adjusted under 35 U.S.C. 154(b) by 49 days.

(21) Appl. No.: 17/685,439

(22) Filed: Mar. 3, 2022

(65) Prior Publication Data
US 2022/0293342 A1    Sep. 15, 2022

(30) Foreign Application Priority Data
Mar. 12, 2021    (JP) .................................. 2021-039896

(51) Int. Cl.
*H01G 4/005*    (2006.01)
*H01G 4/30*    (2006.01)
*H01G 4/12*    (2006.01)

(52) U.S. Cl.
CPC .............. *H01G 4/005* (2013.01); *H01G 4/12* (2013.01); *H01G 4/30* (2013.01)

(58) Field of Classification Search
CPC ............ H01G 4/30; H01G 4/12; H01G 4/005; H01G 4/248
USPC ............ 361/301.4, 321.1, 321.3, 303, 306.3, 361/321.2
See application file for complete search history.

(56) References Cited

U.S. PATENT DOCUMENTS

| | | | | |
|---|---|---|---|---|
| 4,750,084 | A | * | 6/1988 | Nikaidoh .................. H01G 4/30 29/25.42 |
| 2001/0048581 | A1 | * | 12/2001 | Anthony ............... H01L 23/552 257/E23.114 |
| 2016/0233027 | A1 | * | 8/2016 | Iijima ..................... H01G 4/232 |
| 2016/0268047 | A1 | * | 9/2016 | Shin ....................... H01G 4/232 |

(Continued)

FOREIGN PATENT DOCUMENTS

JP    S5982712 A    5/1984
JP    08-191030 A    7/1996

(Continued)

OTHER PUBLICATIONS

Office Action in JP2021-039896, dated Jul. 18, 2023, 9 pages.

*Primary Examiner* — Arun Ramaswamy
(74) *Attorney, Agent, or Firm* — Keating & Bennett, LLP

(57) ABSTRACT

A multilayer ceramic capacitor includes a multilayer body including first inner electrodes and second inner electrodes stacked in layers and dielectric layers, the multilayer body including a first outer electrode receiving portion at one end thereof in one direction, a second outer electrode receiving portion at the other end thereof in the one direction, and a main portion between the first and second outer electrode receiving portions, a first outer electrode over the first outer electrode receiving portion, and a second outer electrode over the second outer electrode receiving portion. A level difference exists at a boundary between the main portion and the first outer electrode receiving portion and at a boundary between the main portion and the second outer electrode receiving portion. An area of a cross section at a central position of the main portion in the one direction is greater than areas of cross sections at a position of the first outer electrode and at a position the second outer electrode.

13 Claims, 8 Drawing Sheets

(56) References Cited

U.S. PATENT DOCUMENTS

| | | | |
|---|---|---|---|
| 2017/0301470 A1* | 10/2017 | Asai | H01G 4/232 |
| 2018/0053601 A1 | 2/2018 | Sakatsume et al. | |
| 2018/0075968 A1* | 3/2018 | Nakanishi | H01G 4/232 |
| 2020/0027661 A1* | 1/2020 | Park | H01G 4/12 |
| 2021/0065988 A1* | 3/2021 | Kim | H01G 4/252 |

FOREIGN PATENT DOCUMENTS

| | | |
|---|---|---|
| JP | 2002-299146 A | 10/2002 |
| JP | 2008-205073 A | 9/2008 |
| JP | 2018-029118 A | 2/2018 |
| JP | 2018046104 A | 3/2018 |
| JP | 2020013974 A | 1/2020 |

* cited by examiner

MULTILAYER CERAMIC CAPACITOR

CROSS REFERENCE TO RELATED APPLICATIONS

This application claims the benefit of priority to Japanese Patent Application No. 2021-039896 filed on Mar. 12, 2021. The entire contents of this application are hereby incorporated herein by reference.

BACKGROUND OF THE INVENTION

1. Field of the Invention

The present invention relates to a multilayer ceramic capacitor.

2. Description of the Related Art

Multilayer ceramic capacitors have been known, in which a multilayer body with a structure including inner electrodes and dielectric layers alternately stacked has outer electrodes on both end surfaces thereof.

Japanese Unexamined Patent Application Publication No. 2018-29118 discloses an example of such a multilayer ceramic capacitor. In the multilayer ceramic capacitor disclosed, the thickness of an outer electrode on a side surface of a multilayer body, at a position adjacent to a ridge of the multilayer body, and the thickness of the outer electrode on an end surface of the multilayer body, at a position adjacent to the ridge of the multilayer body, are defined on the basis of the dimension of the multilayer ceramic capacitor in a length direction and the dimension of the multilayer ceramic capacitor in a thickness direction. In this multilayer ceramic capacitor, even when outer electrodes are made thinner by miniaturization, a sufficient thickness of the outer electrodes covering the ridges of the multilayer body is maintained, so that the entry of plating solution and moisture into the multilayer body is prevented and a reduction in reliability can be avoided.

SUMMARY OF THE INVENTION

In the multilayer ceramic capacitor described in Japanese Unexamined Patent Application Publication No. 2018-29118, however, the outer electrodes are disposed on the surface of the multilayer body in the shape of a rectangular parallelepiped. Accordingly, bulges of the outer electrodes on the surface of the multilayer body contribute to an increased size of the entire multilayer ceramic capacitor.

Preferred embodiments of the present invention provide compact multilayer ceramic capacitors.

A multilayer ceramic capacitor according to a preferred embodiment of the present invention includes a multilayer body including a plurality of first inner electrodes and a plurality of second inner electrodes stacked in layers and a plurality of dielectric layers each interposed between adjacent ones of the first and second inner electrodes, the multilayer body including a first outer electrode receiving portion at a first end thereof in one direction, a second outer electrode receiving portion at a second end thereof in the one direction, and a main portion between the first outer electrode receiving portion and the second outer electrode receiving portion, a first outer electrode electrically connected to the first inner electrodes and extending over the first outer electrode receiving portion of the multilayer body, and a second outer electrode electrically connected to the second inner electrodes and extending over the second outer electrode receiving portion of the multilayer body. A level difference exists at a boundary between the main portion and the first outer electrode receiving portion of the multilayer body and at a boundary between the main portion and the second outer electrode receiving portion of the multilayer body. An area of a cross section at a central position of the main portion in the one direction, along a plane orthogonal to the one direction, is greater than an area of a cross section at a position of the first outer electrode and a position of the second outer electrode along a plane orthogonal to the one direction.

In a multilayer ceramic capacitor according to a preferred embodiment of the present invention, a level difference exists at a boundary between the main portion and the first outer electrode receiving portion of the multilayer body and at a boundary between the main portion and the second outer electrode receiving portion of the multilayer body. The first outer electrode and the second outer electrode are structured to compensate for the level difference. That is, since the outer electrodes do not bulge outward from the surface of the multilayer body, the size of the entire multilayer ceramic capacitor can be reduced.

The above and other elements, features, steps, characteristics and advantages of the present invention will become more apparent from the following detailed description of the preferred embodiments with reference to the attached drawings.

DETAILED DESCRIPTION OF THE PREFERRED EMBODIMENTS

Features of the present invention will now be described in detail with reference to preferred embodiments of the present invention.

First Preferred Embodiment

Figure 1:
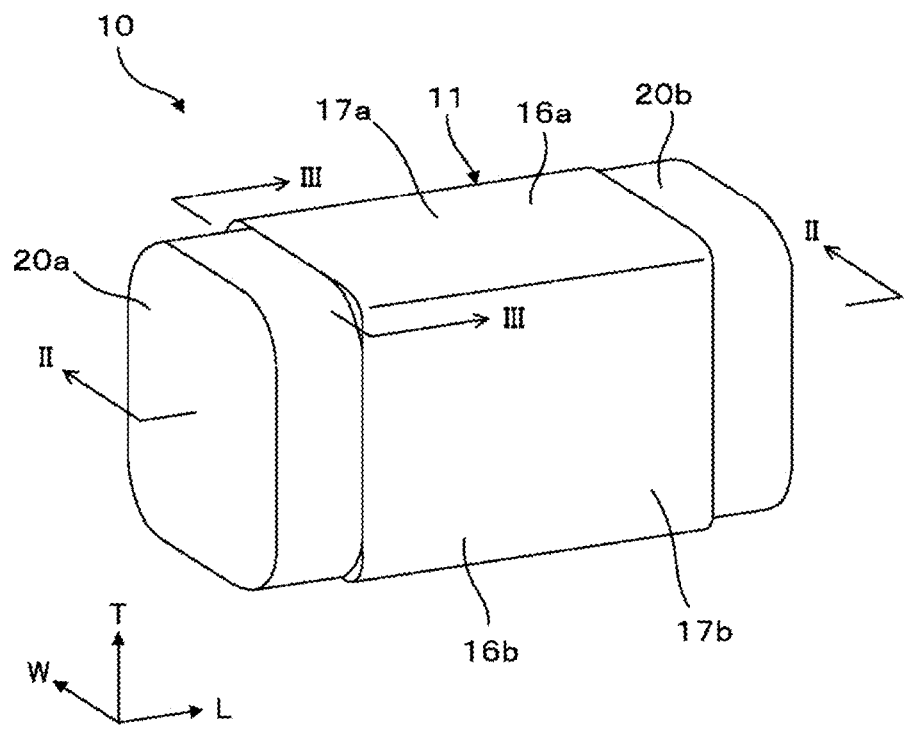
FIG. 1 is a perspective view schematically illustrating a multilayer ceramic capacitor according to a first preferred embodiment of the present invention.
Figure 2:
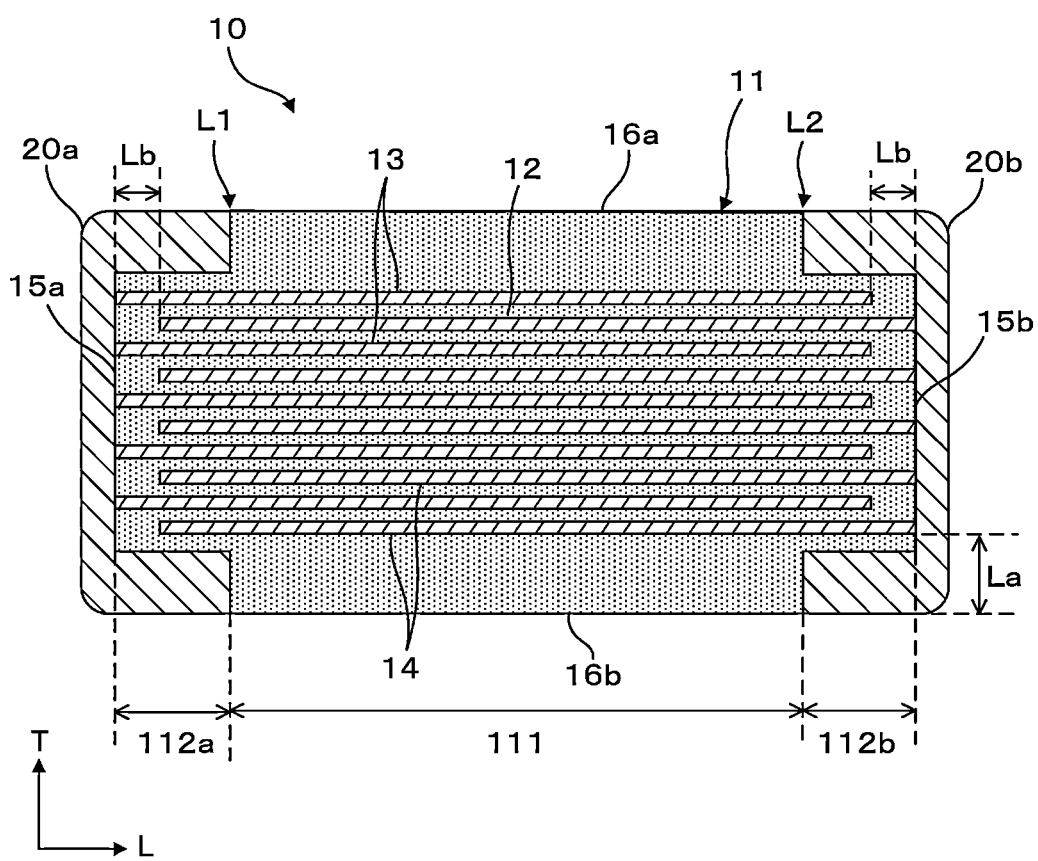
FIG. 2 is a cross-sectional view schematically illustrating a structure of the multilayer ceramic capacitor taken along line II-II in FIG. 1.
Figure 3:
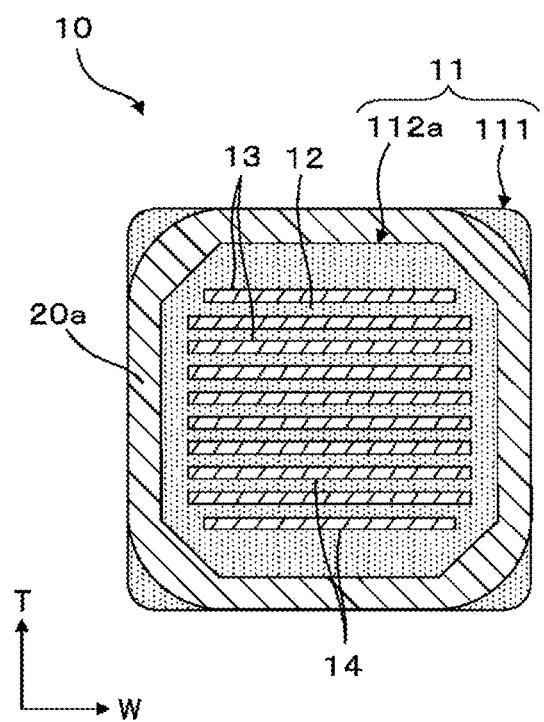
FIG. 3 is a cross-sectional view schematically illustrating a structure of the multilayer ceramic capacitor taken along line III-III in FIG. 1.
Figure 4:
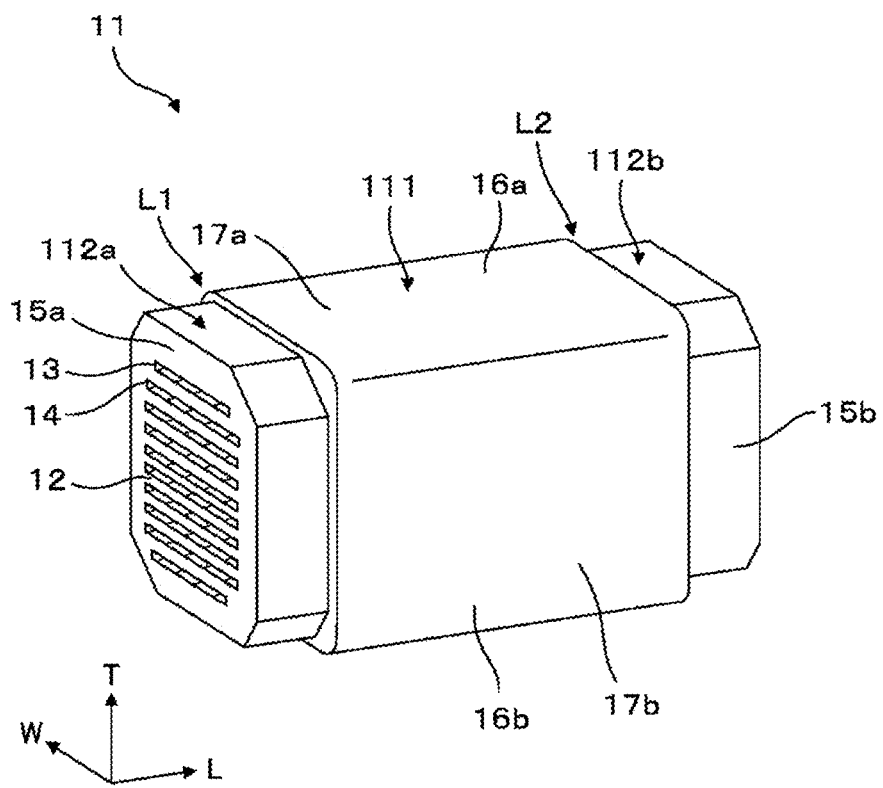
FIG. 4 is a perspective view schematically illustrating the shape of a multilayer body included in the multilayer ceramic capacitor.

FIG. 1 is a perspective view schematically illustrating a multilayer ceramic capacitor 10 according to a first preferred embodiment of the present invention. FIG. 2 is a cross-sectional view schematically illustrating a structure of the multilayer ceramic capacitor 10 taken along line II-II in FIG. 1. FIG. 3 is a cross-sectional view schematically illustrating a structure of the multilayer ceramic capacitor 10 taken along line III-III in FIG. 1. FIG. 4 is a perspective view schematically illustrating the shape of a multilayer body 11 included in the multilayer ceramic capacitor 10.

As illustrated in FIG. 1 to FIG. 3, the multilayer ceramic capacitor 10 has a general shape of a rectangular parallelepiped or an approximate rectangular parallelepiped, and includes the multilayer body 11 and a pair of outer electrodes 20a and 20b on the surface of the multilayer body 11. As illustrated in FIG. 1, the outer electrodes 20a and 20b are disposed opposite each other.

The direction in which the outer electrodes 20a and 20b oppose each other is a length direction L of the multilayer ceramic capacitor 10, the direction in which dielectric layers 12, first inner electrodes 13, and second inner electrodes 14 (described below) are stacked in layers is a stacking direction T, and the direction orthogonal to both the length direction L and the stacking direction T is a width direction W. Any two of the length direction L, the stacking direction T, and the width direction W are orthogonal or substantially orthogonal to each other.

Of the dimensions of the multilayer ceramic capacitor 10 in the length direction L, the width direction W, and the stacking direction T, the dimension in the length direction L is largest in the present preferred embodiment. The multilayer ceramic capacitor 10 may be configured to have the largest dimension in the width direction W.

As illustrated in FIG. 2 and FIG. 3, the multilayer body 11 includes the first inner electrodes 13 and the second inner electrodes 14 stacked in layers, and the dielectric layers 12 each interposed therebetween. That is, the multilayer body 11 has a structure in which the first inner electrodes 13 and the second inner electrodes 14 are alternately stacked in layers in the stacking direction T, with the dielectric layers 12 each interposed between adjacent ones of the first and second inner electrodes 13 and 14.

As illustrated in FIG. 2 and FIG. 4, the multilayer body 11 includes a first outer electrode receiving portion 112a at a first end thereof in one direction, a second outer electrode receiving portion 112b at a second end thereof in the one direction, and a main portion 111 between the first outer electrode receiving portion 112a and the second outer electrode receiving portion 112b. The one direction refers to the length direction L in the present preferred embodiment.

The dielectric layers 12 are made of a ceramic material mainly including, for example, $BaTiO_3$, $CaTiO_3$, $SrTiO_3$, $SrZrO_3$, or, $CaZrO_3$. A sub-component, such as an Mn compound, an Fe compound, a Cr compound, a Co compound, or an Ni compound, lower in content than the main component, may be added to the main component.

The first inner electrodes 13 and the second inner electrodes 14 include, for example, a metal, such as Ni, Ag, Pd, Au, Cu, Ti, or Cr or include, for example, an alloy mainly including any of these metals. As a common material, the first inner electrodes 13 and the second inner electrodes 14 may include the same ceramic material as the dielectric ceramic included in the dielectric layers 12. The content of the common material in the first inner electrodes 13 is, for example, less than or equal to about 20% by volume of all the first inner electrodes 13, for example. The content of the common material in the second inner electrodes 14 is substantially the same as that in the first inner electrodes 13, for example.

Not all materials of the first inner electrodes 13 and the second inner electrodes 14 have to be the same, and different materials may be used or included or substituted. Materials of each of the inner electrodes 13 and 14 may be different depending on the region.

The main portion 111 of the multilayer body 11 is in the shape of a quadrangular prism or a substantially quadrangular prism. The main portion 111 includes a first principal surface 16a and a second principal surface 16b opposite each other in the stacking direction T, and a first side surface 17a and a second side surface 17b opposite each other in the width direction W. Ridges of the main portion 111 may be rounded, and corners of the main portion 111 may also be rounded. The ridges are where two surfaces of the main portion 111 meet, and the corners are where three surfaces of the main portion 111 meet.

As illustrated in FIG. 4, in the multilayer ceramic capacitor 10 according to the present preferred embodiment, the first outer electrode receiving portion 112a of the multilayer body 11 is in the shape of an octagonal prism or a substantially octagonal prism. That is, as illustrated in FIG. 3, a cross section of the first outer electrode receiving portion 112a of the multilayer body 11 taken along a plane orthogonal to one direction (or length direction L in the present preferred embodiment) is octagonal or substantially orthogonal. In other words, a cross section of the multilayer body 11 obtained by cutting the multilayer ceramic capacitor 10 at the first outer electrode 20a along a plane orthogonal to the length direction L is octagonal or substantially octagonal.

Similarly, a cross section of the second outer electrode receiving portion 112b of the multilayer body 11 taken along a plane orthogonal to one direction (or length direction L in the present preferred embodiment) is octagonal or substantially octagonal. In other words, a cross section of the multilayer body 11 obtained by cutting the multilayer ceramic capacitor 10 at the second outer electrode 20b along a plane orthogonal to the length direction L is octagonal or substantially octagonal.

The cross sections of the first outer electrode receiving portion 112a and the second outer electrode receiving portion 112b, each taken along a plane orthogonal to the one direction, are not limited to being octagonal or substantially octagonal. For example, the cross sections may be in the shape of a polygon with eight or more sides, such as a dodecagon.

As described above, when the cross sections of the first outer electrode receiving portion 112a and the second outer electrode receiving portion 112b, each taken along a plane orthogonal to the one direction, are in the shape of a polygon with eight or more sides, the outer electrodes 20a and 20b on the ridges of the first outer electrode receiving portion 112a and the second outer electrode receiving portion 112b can be prevented from becoming thinner. That is, in the multilayer ceramic capacitor of the related art where the multilayer body is in the shape of a rectangular parallelepiped or substantially a rectangular parallelepiped, when outer electrodes are formed by immersing the multilayer body in an outer electrode conductive paste, the sharp ridges of the multilayer body do not allow easy adhesion of the outer electrode conductive paste thereto. As a result, the outer electrodes on the ridges tend to be thinner. In the multilayer ceramic capacitor 10 according to the present preferred embodiment, however, the cross sections described above are not in the shape of a quadrangle, but are in the shape of a polygon with eight or more sides. Therefore, since the resulting smoother ridges facilitate adhesion of the outer electrode conductive paste thereto, the outer electrodes 20a and 20b on the ridges can be prevented from becoming thinner.

As illustrated in FIG. 2 and FIG. 4, a level difference exists at a boundary L1 between the main portion 111 and the first outer electrode receiving portion 112a of the multilayer body 11 and at a boundary L2 between the main portion 111 and the second outer electrode receiving portion 112b of the multilayer body 11. That is, at the boundary L1 between the main portion 111 and the first outer electrode receiving portion 112a, the dimension of the main portion 111 in the stacking direction T is greater than the dimension of the first outer electrode receiving portion 112a in the stacking direction T, and the dimension of the main portion 111 in the width direction W is greater than the dimension of the first outer electrode receiving portion 112a in the width direction W. Also, at the boundary L2 between the main portion 111 and the second outer electrode receiving portion 112b of the multilayer body 11, the dimension of the main portion 111 in the stacking direction T is greater than the dimension of the second outer electrode receiving portion 112b in the stacking direction T, and the dimension of the main portion 111 in the width direction W is greater than the dimension of the second outer electrode receiving portion 112b in the width direction W.

Figure 5A:
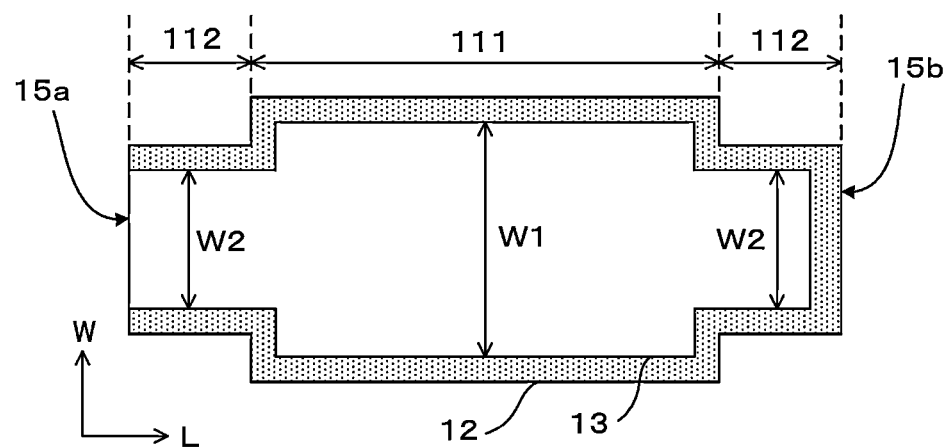
FIG. 5A is a plan view illustrating the shapes of and the positional relation between a dielectric layer and a first inner electrode.
Figure 5B:
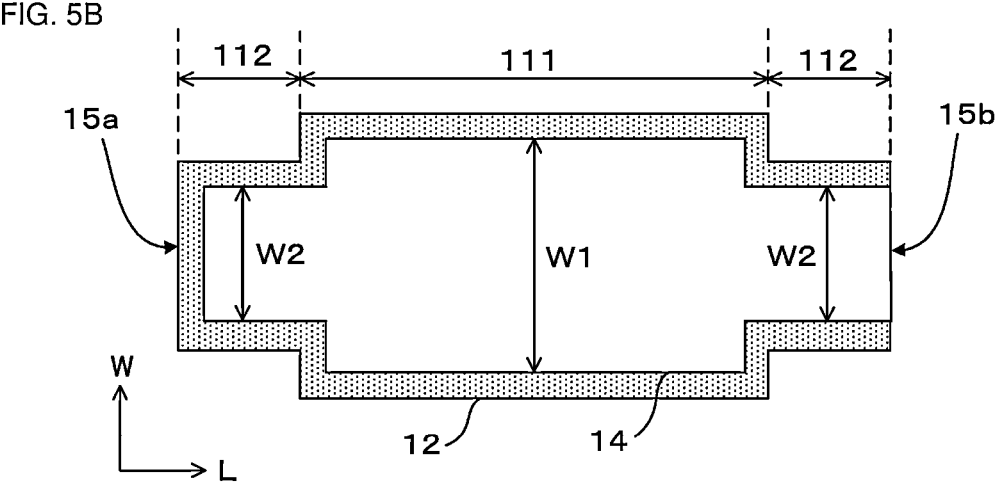
FIG. 5B is a plan view illustrating the shapes of and the positional relation between the dielectric layer and a second inner electrode.

FIG. 5A is a plan view illustrating the shapes of and the positional relation between the dielectric layer 12 and the first inner electrode 13, and FIG. 5B is a plan view illustrating the shapes of and the positional relation between the dielectric layer 12 and the second inner electrode 14. As illustrated in FIG. 5A, the first inner electrode 13 is extended to the first end surface 15a, which is one of the surfaces of the multilayer body 11 in the length direction L, and is electrically connected to the first outer electrode 20a described below. The first inner electrode 13 is also present in the second outer electrode receiving portion 112b, but is not extended to the second end surface 15b.

As illustrated in FIG. 5B, the second inner electrode 14 is extended to the second end surface 15b, which is the other one of the surfaces of the multilayer body 11 in the length direction L, and is electrically connected to the second outer electrode 20b described below. The second inner electrode 14 is also present in the first outer electrode receiving portion 112a, but is not extended to the first end surface 15a.

The multilayer body 11 may include not only the first inner electrodes 13 and the second inner electrodes 14, but also inner electrodes that are not electrically connected to the first outer electrode 20a and the second outer electrode 20b.

As illustrated in FIG. 5A, of the dimensions of the first inner electrode 13 in a direction orthogonal to the one direction, that is, of the dimensions of the first inner electrode 13 in the width direction W in the present preferred embodiment, a dimension W1 at the center of the main portion 111 in the length direction L is greater than a dimension W2 inside the first outer electrode receiving portion 112a and the second outer electrode receiving portion 112b.

Also, as illustrated in FIG. 5B, of the dimensions of the second inner electrode 14 in a direction orthogonal to the one direction, that is, of the dimensions of the second inner electrode 14 in the width direction W in the present preferred embodiment, the dimension W1 at the center of the main portion 111 in the length direction L is greater than the dimension W2 inside the first outer electrode receiving portion 112a and the second outer electrode receiving portion 112b.

As described above, a level difference exists at the boundary L1 between the main portion 111 and the first outer electrode receiving portion 112a of the multilayer body 11 and at the boundary L2 between the main portion 111 and the second outer electrode receiving portion 112b of the multilayer body 11. The dimensions of the first outer electrode receiving portion 112a and the second outer electrode receiving portion 112b in the width direction W are smaller than the dimension of the main portion 111 in the width direction W. Therefore, if the dimensions of the inner electrodes 13 and 14 in the width direction W are set to be uniform in accordance with the dimensions of the first outer electrode receiving portion 112a and the second outer electrode receiving portion 112b in the width direction W, the size of the inner electrodes 13 and 14 is reduced.

The multilayer ceramic capacitor 10 according to the present preferred embodiment is configured such that, of the dimensions of the first inner electrode 13 in the width direction W, the dimension W1 at the center of the main portion 111 in the length direction L is greater than the dimension W2 inside the first outer electrode receiving portion 112a and the second outer electrode receiving portion 112b and also such that, of the dimensions of the second inner electrode 14 in the width direction W, the dimension W1 at the center of the main portion 111 in the length direction L is greater than the dimension W2 inside the first outer electrode receiving portion 112a and the second outer electrode receiving portion 112b. This can make the first inner electrodes 13 and the second inner electrodes 14 greater in size, and thus can make the electrostatic capacitance of the multilayer ceramic capacitor 10 higher, than when the first inner electrodes 13 and the second inner electrodes 14 are set to be uniform in the width direction W.

It has been described that the first inner electrode 13 and the second inner electrode 14 have the same dimension (W1) in the width direction W, at the center of the main portion 111 in the length direction L, but their dimensions in the main portion 111 may be different. Similarly, it has been described that the first inner electrode 13 and the second inner electrode 14 have the same dimension (W2) in the width direction W, in the first outer electrode receiving portion 112a and the second outer electrode receiving portion 112b, but their dimensions in the first outer electrode receiving portion 112a and the second outer electrode receiving portion 112b may be different.

As illustrated in FIG. 3, at least one first inner electrode 13 disposed on an outer side in the stacking direction T has a smaller dimension in a direction orthogonal to the one direction (or in the width direction W in the present preferred embodiment) than the first inner electrodes 13 disposed in a center in the stacking direction T. Note that the "center in the stacking direction T" refers not only to the center position in the stacking direction T, but also to an area around the center position.

Also, at least one second inner electrode 14 disposed on an outer side in the stacking direction T has a smaller dimension in a direction orthogonal to the one direction (or in the width direction W in the present preferred embodiment) than the second inner electrodes 14 disposed in the center in the stacking direction T.

As described above, in the multilayer ceramic capacitor according to the present preferred embodiment, the cross sections of the first outer electrode receiving portion 112a and the second outer electrode receiving portion 112b of the multilayer body 11, each taken along a plane orthogonal to the length direction L, are octagonal or substantially octagonal.

Accordingly, the dimensions of the first outer electrode receiving portion 112a and the second outer electrode receiving portion 112b in the width direction W are smaller on the outer sides in the stacking direction T than in the center in the stacking direction T. Therefore, if the inner electrodes 13 and 14 are configured to have the same dimension in the width direction W, it is difficult to place the inner electrodes 13 and 14 on the outer sides in the stacking direction T. To place the inner electrodes 13 and 14 on the outer sides in the stacking direction T, the dimension of the inner electrodes 13 and 14 in the width direction W is to be reduced and adjusted to the dimension of the first outer electrode receiving portion 112a and the second outer electrode receiving portion 112b in the width direction W on the outer sides in the stacking direction T. That is, if the inner electrodes 13 and 14 have the same dimension in the width direction W, the electrostatic capacitance decreases.

In the multilayer ceramic capacitor 10 according to the present preferred embodiment, on the other hand, at least one first inner electrode 13 disposed on an outer side in the stacking direction T has a smaller dimension in the width direction W than the first inner electrodes 13 disposed in the center in the stacking direction T, and at least one second inner electrode 14 disposed on an outer side in the stacking direction T has a smaller dimension in the width direction W than the second inner electrodes 14 disposed in the center in the stacking direction T. Therefore, without making the dimension of the inner electrodes 13 and 14 in the width direction W smaller in the center in the stacking direction T, the inner electrodes 13 and 14 can be added to the outer sides in the stacking direction T. With this configuration, more inner electrodes 13 and 14 can be stacked and higher electrostatic capacitance of the multilayer ceramic capacitor 10 can be achieved than with the configuration where the inner electrodes 13 and 14 have the same dimension in the width direction W.

Figure 6:
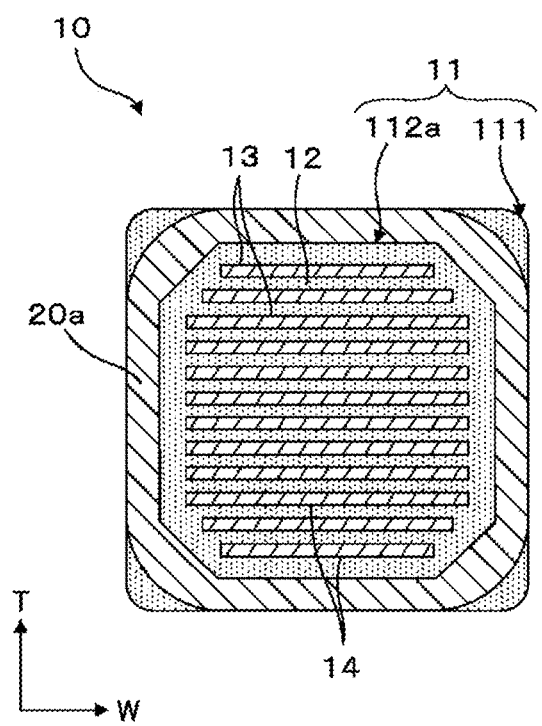
FIG. 6 is a cross-sectional view schematically illustrating a structure of the multilayer ceramic capacitor configured such that the dimensions of the first and second inner electrodes in the width direction gradually decrease from the center toward the outer sides in a stacking direction, taken at the same position as that in the cross-sectional view of FIG. 3.

In FIG. 3, which schematically illustrates a cross-sectional structure of the multilayer ceramic capacitor 10, one first inner electrode 13 disposed on the outermost side in the stacking direction T has a smaller dimension in the width direction W than the other first inner electrodes 13. Alternatively, a plurality of first inner electrodes 13 disposed on the outer side in the stacking direction T may have a smaller dimension in the width direction W than the first inner electrodes 13 disposed in the center in the stacking direction T. Similarly, a plurality of second inner electrodes 14 disposed on the outer side in the stacking direction T may have a smaller dimension in the width direction W than the second inner electrodes 14 disposed in the center in the stacking direction T. In this case, as illustrated in FIG. 6, the multilayer ceramic capacitor 10 may be configured such that the dimensions of the first inner electrodes 13 and the second inner electrodes 14 in the width direction W gradually decrease from the center toward the outer sides in the stacking direction T. This configuration enables more inner electrodes 13 and 14 to be placed in accordance with the shape of the first outer electrode receiving portion 112a and the second outer electrode receiving portion 112b whose dimensions in the width direction W decrease toward the outer sides in the stacking direction T, and thus can increase the electrostatic capacitance of the multilayer ceramic capacitor 10.

Note that the "dimensions of the first inner electrodes 13 and the second inner electrodes 14 in the width direction W gradually decrease from the center toward the outer sides in the stacking direction T" does not mean that the dimensions of all the first inner electrodes 13 and the second inner electrodes 14 in the width direction gradually decrease, but means that the dimensions of some of the first inner electrodes 13 and the second inner electrodes 14 in the width direction W gradually decrease.

The first outer electrode 20a is disposed over the first outer electrode receiving portion 112a of the multilayer body 11. In the present preferred embodiment, the first outer electrode 20a is disposed in such a way as to eliminate the level difference between the main portion 111 and the first outer electrode receiving portion 112a of the multilayer body 11. That is, in a cross section of the multilayer ceramic capacitor 10 taken at a central position in the width direction W along a plane orthogonal to the width direction W, the main portion 111 and the first outer electrode 20a preferably have the same dimension in the stacking direction T. Also, in a cross section of the multilayer ceramic capacitor 10 taken at a central position in the stacking direction T along a plane orthogonal to the stacking direction T, the main portion 111 and the first outer electrode 20a preferably have the same dimension in the width direction W.

In the cross section at the central position in the width direction W described above, however, the main portion 111 and the first outer electrode 20a do not necessarily need to have exactly the same dimension in the stacking direction T. For example, the dimension of the first outer electrode 20a in the stacking direction T may be slightly smaller. Also, in the cross section at the central position in the stacking direction T described above, the main portion 111 and the first outer electrode 20a do not necessarily need to have exactly the same dimension in the width direction W. For example, the dimension of the first outer electrode 20a in the width direction W may be slightly smaller.

The second outer electrode 20b is disposed over the second outer electrode receiving portion 112b of the multilayer body 11. In the present preferred embodiment, the second outer electrode 20b is disposed in such a way as to eliminate the level difference between the main portion 111 and the second outer electrode receiving portion 112b of the multilayer body 11. That is, in a cross section of the multilayer ceramic capacitor 10 taken at a central position in the width direction W along a plane orthogonal to the width direction W, the main portion 111 and the second outer electrode 20b preferably have the same dimension in the stacking direction T. Also, in a cross section of the multilayer ceramic capacitor 10 taken at a central position in the stacking direction T along a plane orthogonal to the stacking direction T, the main portion 111 and the second outer electrode 20b preferably have the same dimension in the width direction W.

In the cross section at the central position in the width direction W described above, however, the main portion 111 and the second outer electrode 20b do not necessarily need to have exactly the same dimension in the stacking direction T. For example, the dimension of the second outer electrode 20b in the stacking direction T may be slightly smaller. Also, in the cross section at the central position in the stacking direction T described above, the main portion 111 and the second outer electrode 20b do not necessarily need to have exactly the same dimension in the width direction W. For example, the dimension of the second outer electrode 20b in the width direction W may be slightly smaller.

The first outer electrode 20a and the second outer electrode 20b can be formed through a process which involves immersing the multilayer body 11 in an outer electrode conductive paste and then firing the multilayer body 11. As described above, the cross sections of the first outer electrode receiving portion 112a and the second outer electrode receiving portion 112b of the multilayer body 11, each taken along a plane orthogonal to the length direction L, are octagonal or substantially octagonal. Therefore, when the outer electrodes 20a and 20b are formed by immersing the multilayer body 11 in the outer electrode conductive paste, the positions of the ridges of the outer electrodes 20a and 20b are inside the positions of the ridges of the main portion 111 of the multilayer body 11, as illustrated in FIG. 3.

Accordingly, the area of the cross section of the multilayer ceramic capacitor 10 taken at the central position in one direction (or length direction L in the present preferred embodiment) along a plane orthogonal to the length direction L, is greater than the area of the cross section of the multilayer ceramic capacitor 10 taken at the first outer electrode 20a and the second outer electrode 20b along a plane orthogonal to the length direction L. Note that the "area of the cross section of the multilayer ceramic capacitor 10 taken at the central position in the length direction L along a plane orthogonal to the length direction L" refers to the area of the cross section of the main portion 111 taken at the central position in the length direction L.

The first outer electrode 20a and the second outer electrode 20b each include, for example, an underlying electrode layer and a plating layer disposed on the underlying electrode layer.

The underlying electrode layer includes at least one of, for example, a baked electrode layer, a resin electrode layer, and a thin-film electrode layer described below. To bring the coefficient of linear expansion of the first outer electrode 20a and the second outer electrode 20b closer to the coefficient of linear expansion of the dielectric layers 12, the underlying electrode layer may include a common material including the same material as, or a material similar to, a material included in the dielectric layers 12, or may include glass. When the underlying electrode layer includes a common material or glass, its content is preferably greater than or equal to about 30% by volume and less than or equal to about 70% by volume of all the outer electrodes, for example.

The baked electrode layer is a layer including glass and metal. Either one or a plurality of baked electrode layers may be provided. For example, the baked electrode layer includes a metal, such as Ni, Ag, Pd, Au, Cu, Ti, or Cr or an alloy including these metals. The baked electrode layer can be formed, for example, by immersing a multilayer body in a paste bath storing a conductive paste including glass and metal, and baking the multilayer body after the immersion.

The resin electrode layer can be formed as a layer including, for example, conducting particles and thermosetting resin. In the case of forming a resin electrode layer, the resin electrode layer may be directly formed on a ceramic body without forming an intervening electrode layer. Either one or a plurality of resin electrode layers may be provided.

The thin-film electrode layer is, for example, a layer of less than or equal to about 1 μm formed by depositing metal particles. The thin-film electrode layer can be formed by a known thin-film forming method, such as sputtering or evaporation.

The plating layer disposed on the underlying electrode layer includes, for example, a metal, such as Cu, Ni, Ag, Pd, Ti, Cr, or Au or includes, for example, an alloy mainly including any of these metals. Either one or a plurality of plating layers may be provided. The plating layer preferably has a two-layer structure including an Ni plating layer and an Sn plating layer. The Ni plating layer prevents the underlying electrode layer from being eroded by solder used in mounting the multilayer ceramic capacitor 10. The Sn plating layer enhances wettability of solder used in mounting the multilayer ceramic capacitor 10.

An example of the size of the multilayer ceramic capacitor 10 will now be described. The dimension of the multilayer ceramic capacitor 10 in the length direction L is, for example, greater than or equal to about 0.7 mm and less than or equal to about 1.2 mm and is, for example, about 1.0 mm. The dimension of the multilayer ceramic capacitor 10 in the width direction W is, for example, greater than or equal to about 0.4 mm and less than or equal to about 0.6 mm and is, for example, about 0.5 mm. The dimension of the multilayer ceramic capacitor 10 in the stacking direction T is, for example, greater than or equal to about 0.4 mm and less than or equal to about 0.6 mm and is, for example, about 0.5 mm. The dimension of the main portion 111 of the multilayer body 11 in the length direction L is, for example, greater than or equal to about 0.4 mm and less than or equal to about 0.7 mm and is, for example, about 0.6 mm. The dimension of the first outer electrode receiving portion 112a and the second outer electrode receiving portion 112b of the multilayer body 11 in the length direction L is, for example, greater than or equal to about 0.15 mm and less than or equal to about 0.25 mm and is, for example, about 0.2 mm. The thickness of the dielectric layer 12 in the stacking direction T is, for example, greater than or equal to about 0.001 mm and less than or equal to about 0.01 mm and is, for example, about 0.002 mm. The thickness of the first inner electrode 13 and the second inner electrode 14 in the stacking direction T is, for example, greater than or equal to about 0.001 mm and less than or equal to about 0.008 mm and is, for example, about 0.002 mm. The dimension W1 of the first inner electrode 13 and the second inner electrode 14 described above is, for example, greater than or equal to about 0.2 mm and less than or equal to about 0.58 mm and is, for example, about 0.44 mm. The dimension W2 of the first inner electrode 13 and the second inner electrode 14 described above is, for example, greater than or equal to about 0.001 mm and less than or equal to about 0.574 mm and is, for example, about 0.42 mm. The thickness of the first outer electrode 20a and the second outer electrode 20b is, for example, greater than or equal to about 0.003 mm and less than or equal to about 0.1 mm and is, for example, about 0.01 mm. A distance La (see FIG. 2) from the inner electrode 13 or 14 on the outermost side in the stacking direction T to the surface of the multilayer ceramic capacitor 10 is, for example, greater than or equal to about 0.03 mm and less than or equal to about 0.1 mm and is, for example, about 0.06 mm. A distance Lb (see FIG. 2) from one end of the first inner electrode 13 to the second end surface 15b of the multilayer body 11, and from one end of the second inner electrode 14 to the first end surface 15a of the multilayer body 11, is, for example, greater than or equal to about 0.03 mm and less than or equal to about 0.2 mm and is, for example, about 0.06 mm.

In the multilayer ceramic capacitor 10 according to the present preferred embodiment, a level difference exists at the boundary L1 between the main portion 111 and the first outer electrode receiving portion 112a of the multilayer body 11 and at the boundary L2 between the main portion 111 and the second outer electrode receiving portion 112b of the multilayer body 11. The first outer electrode 20a and the second outer electrode 20b are structured to compensate for the level difference. That is, the outer electrodes 20a and 20b do not bulge outward from the surface of the multilayer body 11. This can make the size of the entire multilayer ceramic capacitor 10 smaller than that of the related art capacitor where the outer electrodes are disposed on the surface of the multilayer body in the shape of a rectangular parallelepiped.

Since the outer electrodes 20a and 20b can be prevented from bulging outward from the surface of the multilayer body 11, the size of the multilayer body 11 can be brought closer to the size of the multilayer ceramic capacitor 10. This can increase the electrostatic capacitance per unit size.

For example, during conveyance of a plurality of multilayer ceramic capacitors, a multilayer ceramic capacitor of the related art having a multilayer body in the shape of a rectangular parallelepiped may be caught on other multilayer ceramic capacitors, due to outward bulges of the outer electrodes. However, the multilayer ceramic capacitor 10 according to the present preferred embodiment is configured such that the outer electrodes 20a and 20b do not bulge outward. This can prevent the multilayer ceramic capacitors 10 from being caught on each other.

In the multilayer ceramic capacitor of the related art in which the multilayer body is in the shape of a rectangular parallelepiped, when outer electrodes are formed by immersing the multilayer body in an outer electrode conductive paste, the shape of the outer electrodes may not be controlled to have a desired shape, due to wetting of the outer electrode conductive paste. In the multilayer ceramic capacitor 10 according to the present preferred embodiment, however, a level difference exists at the boundary L1 between the main portion 111 and the first outer electrode receiving portion 112a of the multilayer body 11 and at the boundary L2 between the main portion 111 and the second outer electrode receiving portion 112b of the multilayer body 11. Since the multilayer body 11 is immersed in the outer electrode conductive paste in such a way that the first outer electrode receiving portion 112a and the second outer electrode receiving portion 112b are covered, the outer electrode conductive paste can be prevented from wetting at the level difference (or stepped) portion. The shape of the outer electrodes 20a and 20b can thus be easily controlled to have a desired shape.

The multilayer ceramic capacitor 10 described above can be produced, for example, using a 3D printer. That is, first, an unfired multilayer body having the structure described above is made by inkjet printing, which involves using ink for dielectric layers and ink for inner electrodes. Then, after the unfired multilayer body is immersed in an outer electrode conductive paste and fired, a plating layer is formed as necessary, so that the multilayer ceramic capacitor 10 having the structure described above is obtained. The immersion of the unfired multilayer body in the outer electrode conductive paste may be preceded by firing of the unfired multilayer body.

The unfired multilayer body may be made by pressing a laminate of ceramic green sheets coated with an inner electrode conductive paste. Then, after the unfired multilayer body is immersed in an outer electrode conductive paste and fired, a plating layer is formed as necessary, so that the multilayer ceramic capacitor 10 having the structure described above is obtained. Again, the immersion of the unfired multilayer body in the outer electrode conductive paste may be preceded by firing of the unfired multilayer body.

Second Preferred Embodiment

In the multilayer ceramic capacitor 10 according to the first preferred embodiment, the cross sections of the first outer electrode receiving portion 112a and the second outer electrode receiving portion 112b, each taken along a plane orthogonal to one direction, are octagonal or substantially octagonal.

In a multilayer ceramic capacitor 10A according to a second preferred embodiment, in contrast, the cross sections of the first outer electrode receiving portion 112a and the second outer electrode receiving portion 112b, each taken along a plane orthogonal to one direction, are circular. The one direction in the present preferred embodiment also refers to the length direction L.

Figure 7:
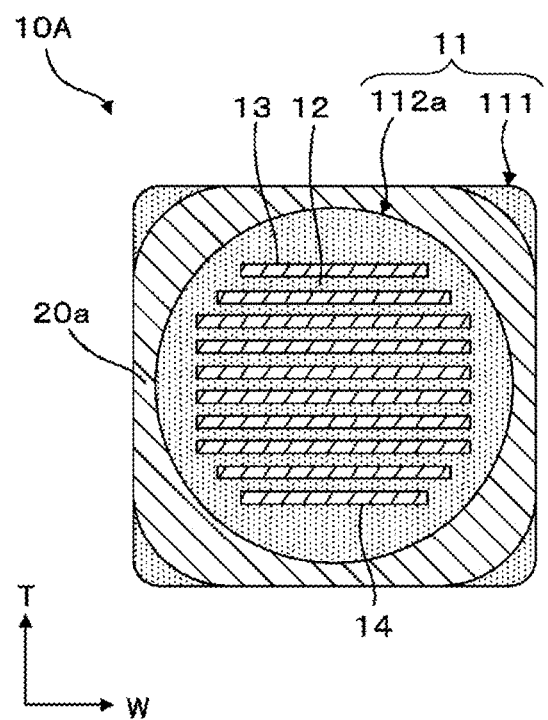
FIG. 7 is a diagram schematically illustrating a cross-sectional structure of a multilayer ceramic capacitor according to a second preferred embodiment of the present invention, taken along a plane orthogonal to a length direction at the position of a first outer electrode receiving portion.

FIG. 7 is a cross-sectional view schematically illustrating a structure of the multilayer ceramic capacitor 10A according to the second preferred embodiment, taken along a plane orthogonal to the length direction L (one direction) at the same position as that in the cross-sectional view of FIG. 3, that is, at the position of the first outer electrode receiving portion 112a. As illustrated in FIG. 7, the shape of the first outer electrode receiving portion 112a obtained by cutting the multilayer ceramic capacitor 10A along a plane orthogonal to the length direction L at the position of the first outer electrode receiving portion 112a is circular. That is, the first outer electrode receiving portion 112a has a cylindrical shape.

Similarly, the shape of the second outer electrode receiving portion 112b obtained by cutting the multilayer ceramic capacitor 10A along a plane orthogonal to the length direction L at the position of the second outer electrode receiving portion 112b is circular. That is, the second outer electrode receiving portion 112b has a cylindrical or substantially cylindrical shape.

In the present preferred embodiment, again, at least one first inner electrode 13 disposed on an outer side in the stacking direction T has a smaller dimension in the width direction W than the first inner electrodes 13 disposed in the center in the stacking direction T. Also, at least one second inner electrode 14 disposed on an outer side in the stacking direction T has a smaller dimension in the width direction W than the second inner electrodes 14 disposed in the center in the stacking direction T. With this configuration, as in the multilayer ceramic capacitor 10 according to the first preferred embodiment, more inner electrodes 13 and 14 can be stacked and higher electrostatic capacitance can be achieved than with the configuration where the inner electrodes 13 and 14 have the same dimension in the width direction W.

Note that FIG. 7 illustrates a configuration where the dimensions of the first inner electrodes 13 and the second inner electrodes 14 in the width direction W gradually decrease from the center toward the outer sides in the stacking direction T.

Third Preferred Embodiment

In a multilayer ceramic capacitor 10B according to a third preferred embodiment, the cross sections of the first outer electrode receiving portion 112a and the second outer electrode receiving portion 112b, each taken along a plane orthogonal to one direction, are in the shape of a rectangle with rounded corners. The one direction in the present preferred embodiment also refers to the length direction L.

Figure 8:
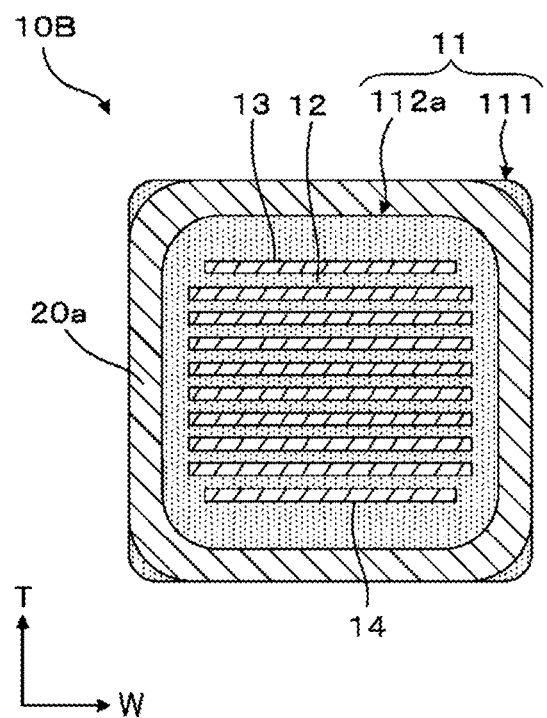
FIG. 8 is a diagram schematically illustrating a cross-sectional structure of a multilayer ceramic capacitor according to a third preferred embodiment of the present invention, taken along a plane orthogonal to the length direction at the position of the first outer electrode receiving portion.

FIG. 8 is a cross-sectional view schematically illustrating a structure of the multilayer ceramic capacitor 10B according to the third preferred embodiment, taken along a plane orthogonal to the length direction L (one direction) at the same position as that in the cross-sectional view of FIG. 3, that is, at the position of the first outer electrode receiving portion 112a. As illustrated in FIG. 8, the shape of the first outer electrode receiving portion 112a obtained by cutting the multilayer ceramic capacitor 10B along a plane orthogonal to the length direction L at the position of the first outer electrode receiving portion 112a is a rectangle with rounded corners or, in other words, a round-cornered rectangle.

Similarly, the shape of the second outer electrode receiving portion 112b obtained by cutting the multilayer ceramic capacitor 10B along a plane orthogonal to the length direction L at the position of the second outer electrode receiving portion 112b is a rectangle with rounded corners or, in other words, a round-cornered rectangle. The radius of the rounded corners of the first outer electrode receiving portion 112a and the second outer electrode receiving portion 112b is, for example, greater than or equal to about 0.01 mm and less than or equal to about 0.25 mm and is, for example, about 0.04 mm.

In the present preferred embodiment, again, at least one first inner electrode 13 disposed on an outer side in the stacking direction T has a smaller dimension in the width direction W than the first inner electrodes 13 disposed in the center in the stacking direction T. Also, at least one second inner electrode 14 disposed on an outer side in the stacking direction T has a smaller dimension in the width direction W than the second inner electrodes 14 disposed in the center in the stacking direction T. With this configuration, as in the multilayer ceramic capacitor 10 according to the first preferred embodiment, more inner electrodes 13 and 14 can be stacked and higher electrostatic capacitance can be achieved than with the configuration where the inner electrodes 13 and 14 have the same dimension in the width direction W.

As in the first preferred embodiment, a plurality of first inner electrodes 13 disposed on the outer side in the stacking direction T may have a smaller dimension in the width direction W than the first inner electrodes 13 disposed in the center in the stacking direction T. Also, a plurality of second inner electrodes 14 disposed on the outer side in the stacking direction T may have a smaller dimension in the width direction W than the second inner electrodes 14 disposed in the center in the stacking direction T. In this case, the dimensions of the first inner electrodes 13 and the second inner electrodes 14 in the width direction W may gradually decrease from the center toward the outer sides in the stacking direction T.

The present invention is not limited to the preferred embodiments described above and can be applied or modified in various ways within the scope of the present invention. For example, the first inner electrodes 13 and the second inner electrodes 14 may be rectangular or substantially rectangular in shape. As described above, however, it is preferable that, of the dimensions of the first inner electrode 13 in the width direction W, the dimension W1 at the center of the main portion 111 in the length direction L be greater than the dimension W2 inside the first outer electrode receiving portion 112a and the second outer electrode receiving portion 112b and also preferable that, of the dimensions of the second inner electrode 14 in the width direction W, the dimension W1 at the center of the main portion 111 in the length direction L be greater than the dimension W2 inside the first outer electrode receiving portion 112a and the second outer electrode receiving portion 112b. This configuration is preferable because the size of the first inner electrodes 13 and the second inner electrodes 14 can be increased in accordance with the shapes of the main portion 111, the first outer electrode receiving portion 112a, and the second outer electrode receiving portion 112b.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. A multilayer ceramic capacitor comprising:
   a multilayer body including a plurality of first inner electrodes and a plurality of second inner electrodes stacked in layers and a plurality of dielectric layers each interposed between adjacent ones of the first and second inner electrodes, the multilayer body including a first outer electrode receiving portion at a first end thereof in one direction, a second outer electrode receiving portion at a second end thereof in the one direction, and a main portion between the first outer electrode receiving portion and the second outer electrode receiving portion;
   a first outer electrode electrically connected to the first inner electrodes and extending over the first outer electrode receiving portion of the multilayer body; and
   a second outer electrode electrically connected to the second inner electrodes and extending over the second outer electrode receiving portion of the multilayer body; wherein
   a level difference exists at a boundary between the main portion and the first outer electrode receiving portion of the multilayer body and at a boundary between the main portion and the second outer electrode receiving portion of the multilayer body;
   an area of a cross section at a central position of the main portion in the one direction, along a plane orthogonal to the one direction, is greater than an area of a cross section at a position of the first outer electrode and a cross section at a position of the second outer electrode along a plane orthogonal to the one direction; and
   the multilayer body satisfies at least one of the following:
      a cross-sectional shape of the first outer electrode receiving portion and the second outer electrode receiving portion taken along the plane orthogonal to the one direction is a circle;
      a shape of each of the first outer electrode receiving portion and the second outer electrode receiving portion is cylindrical or substantially cylindrical;
      each of the first outer electrode receiving portion and the second outer electrode receiving portion has an octagonal prism shape or a substantially octagonal prism shape; and
      each of the cross section at the position of the first outer electrode and the cross section at the position of the second outer electrode along the plane orthogonal to the one direction is octagonal or substantially octagonal.

2. The multilayer ceramic capacitor according to claim 1, wherein of dimensions of the first inner electrodes in a direction orthogonal to the one direction, a dimension at the central position of the main portion in the one direction is greater than a dimension at positions in the first outer electrode receiving portion and the second outer electrode receiving portion; and of dimensions of the second inner electrodes in the direction orthogonal to the one direction, a dimension at the central position of the main portion in the one direction is greater than a dimension at positions in the first outer electrode receiving portion and the second outer electrode receiving portion.

3. The multilayer ceramic capacitor according to claim 1, wherein at least one first inner electrode on an outer side in a stacking direction of the first inner electrodes and the second inner electrodes has a smaller dimension in a direction orthogonal to the one direction than the first inner electrodes in a center in the stacking direction; and at least one second inner electrode on an outer side in the stacking direction has a smaller dimension in the direction orthogonal to the one direction than the second inner electrodes in a center in the stacking direction.

4. The multilayer ceramic capacitor according to claim 3, wherein the dimensions of the first inner electrodes and the second inner electrodes in the direction orthogonal to the one direction decrease from the center toward outer sides in the stacking direction.

5. The multilayer ceramic capacitor according to claim 1, wherein the main portion includes rounded ridges or rounded corners.

6. The multilayer ceramic capacitor according to claim 1, wherein the multilayer body includes additional inner electrodes not electrically connected to the first outer electrode or the second outer electrode.

7. The multilayer ceramic capacitor according to claim 1, wherein the first outer electrode eliminates a level difference between the main portion and the first outer electrode receiving portion.

8. The multilayer ceramic capacitor according to claim 1, wherein the second outer electrode eliminates a level difference between the main portion and the second outer electrode receiving portion.

9. The multilayer ceramic capacitor according to claim 1, wherein each of the first outer electrode and the second outer electrode includes an underlying electrode layer and a plating layer.

10. The multilayer ceramic capacitor according to claim 9, wherein underlying electrode layer includes at least one of a baked electrode layer, a resin electrode layer, and a thin-film electrode layer.

11. The multilayer ceramic capacitor according to claim 9, wherein the plating layer includes an Ni plating layer and a Sn plating layer.

12. The multilayer ceramic capacitor according to claim 1, wherein the first outer electrode and the second outer electrode compensate for a level difference between the main portion and the first outer electrode receiving portion and a level difference between the main portion and the second outer electrode receiving portion.

13. The multilayer ceramic capacitor according to claim 1, wherein the first outer electrode and the second outer electrode do not bulge outward from the multilayer body.

* * * * *